Sept. 27, 1960 R. T. WALKER 2,953,806
STORAGE OF VACUUM HOSE
Filed July 11, 1958
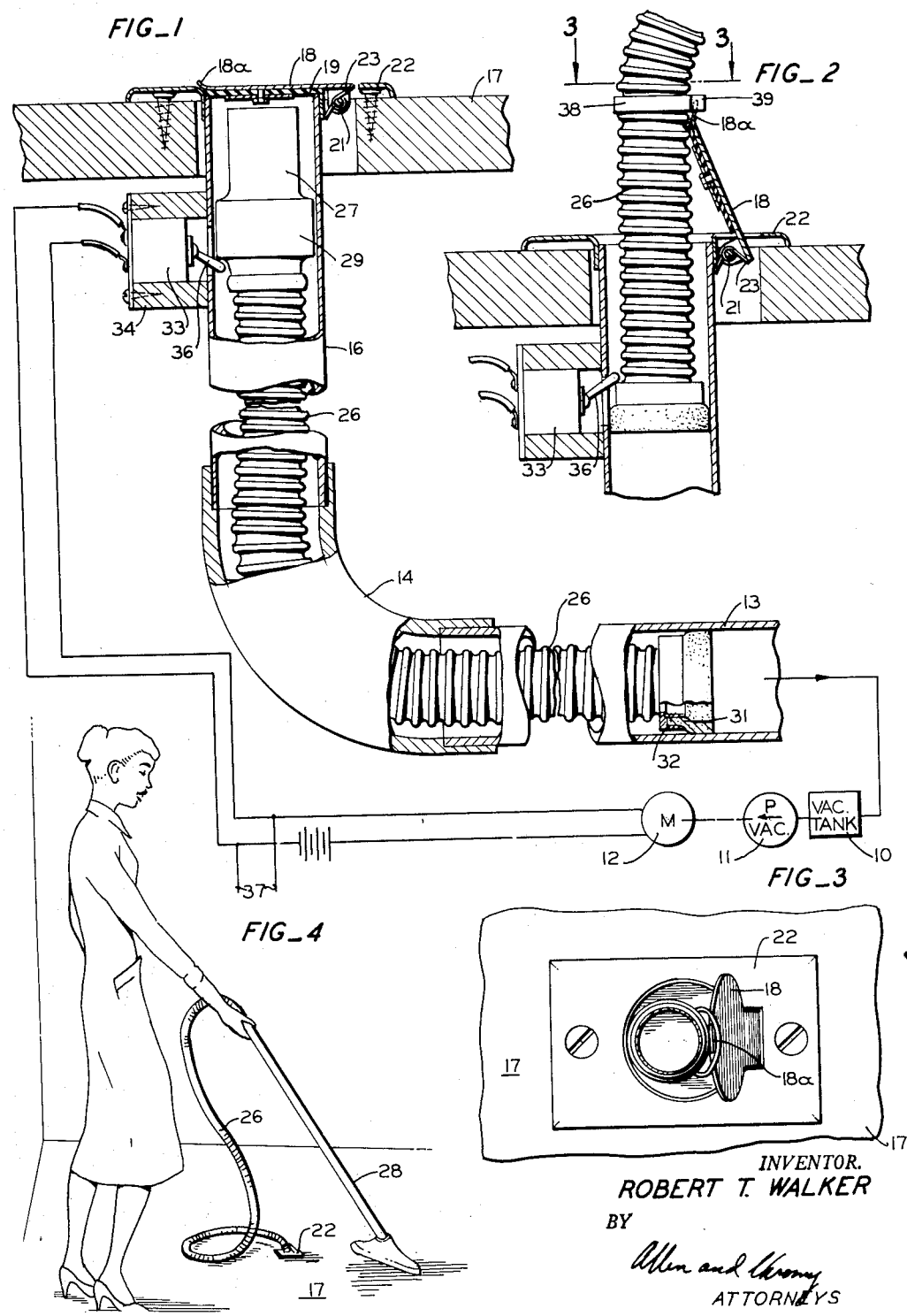
INVENTOR.
ROBERT T. WALKER
BY
Allen and Chromy
ATTORNEYS United States Patent Office 2,953,806
Patented Sept. 27, 1960

2,953,806
STORAGE OF VACUUM HOSE
Robert T. Walker, 144 Sequoia Valley Rd., Mill Valley, Sunnyvale, Calif.
Filed July 11, 1958, Ser. No. 747,947
4 Claims. (Cl. 15—315)

The present invention relates to vacuum systems of the permanently installed type and is concerned more particularly with such a system incorporating means for easily storing the vacuum hose within the vacuum system for ready withdrawal for use when required.

It is a general object of the invention to provide a vacuum system of a permanent installation type in which the conduit for supplying vacuum to an outlet is used to store the hose in an accessible position for manual withdrawl through the outlet.

Another object of the invention is to provide a vacuum hose storage system in which the hose can be withdrawn from storage free of vacuum pressure, and the vacuum pressure brought on when the hose is withdrawn and ready for use.

A further object of the invention is to provide a vacuum hose storage system of the type described in which the hose is held or latched when withdrawn from storage so that it will not be accidentally withdrawn into stored position by the vacuum pressure.

The above and other objects of the invention will be apparent from the following description of a preferred embodiment of the invention, as illustrated in the accompanying drawings, in which:

Figure 1 is a fragmentary sectional view of a vacuum storage system, certain parts shown in elevation and others shown schematically;

Figure 2 is a fragmentary view similar to Figure 1 but showing the hose withdrawn from storage and ready for use;

Figure 3 is a sectional plan view taken as indicated by the line 3—3 in Figure 2;

Figure 4 is a perspective view of a room with the vacuum outlet in the floor and illustrating a person using the hose in a vacuuming operation.

Referring to Figure 1, there is shown a vacuum system including a vacuum tank 10, a vacuum pump 11 providing a source of vacuum, and an electric motor 12 for driving the vacuum pump. The vacuum tank 10 is adapted to be connected to several vacuum outlets distributed throughout the structure to be cleaned by vacuum, and one of these conduits is illustrated at 13, which extends from the tank 10 to an elbow bend or connection 14, and thence to an upright section 16 terminating even with the floor 17. The outlet end of the conduit 16 is closed by a cover 18 having a resilient gasket 19 seating on the end of the vacuum conduit section 16. The cover 18 is pivoted at 21 on a plate 22 which surrounds the vacuum conduit 16 and is urged to closed position by a spring 23. The end of the cover 18 is bent upwardly at 18a to provide for manual opening of the cover for the outlet.

As stated above the conduit, including sections 13, 14, 16 provides means for storing a vacuum hose 26, which is of conventional flexible plastic tubing of spiral ribbed design, and this vacuum hose 26 has at its outer or working end a tubular fitting 27 for attachment to a vacuum head 28, this fitting 27 having interposed between it and the hose 26 a cylindrical or annular enlargement 29. At the other end of the vacuum hose 26 there is provided a sealing member 31 of felt or similar material which is held in a mounting ring 32 on the end of the hose 26 and closely fits the inside of the tubing. It will be noted that the inner diameters of the tubing 13, the elbow 14, and the tubing section 16 are the same, thus providing a smooth configuration in making the right angle turn so that there is no interference with insertion or withdrawal of the seal 31. Also, this seal 31 is sufficiently flexible and deformable that it will readily make a 90° turn as shown.

The annular raised portion 29 and the ring 32 which carries the seal 31 provide enlargements on the vacuum hose adjacent the ends thereof which are utilized in controlling the operation of the vacuum system so that the system will be off when the hose is stored and so that the system will be on when the hose is extended. For this purpose a toggle switch 33 is carried by a bracket 34 on the conduit 16 and has its operating lever 36 extending inside of the conduit 16 for operation by the annular enlargement 29 or the ring 32, as shown respectively in Figs. 1 and 2. The switch 33 is in parallel with similar switches with other outlets of the system and for this purpose one or more of parallel connections 37 are provided in the electrical wiring. Closing of the switch 33 or a switch in a circuit including the connectors 37 and the motor 12 actuates the latter.

Means is provided for releasably latching the hose in extended position as shown in Figure 2. The hose 26 carries thin ring 38 which at one side has an extended loop 39 for engagement by the finger control portion 18a of the cover 18 which provides latching means. Thus the hose may be held against the vacuum pressure in extended position until manual release. Upon release of the hose for storage purposes, the person operating the vacuum system will be careful to see that the loop 39 does not contact the switch lever 36 during withdrawal of the hose into the conduit. This may be done by maintaining the loop 39 turned to a position of clearance as shown in Figure 2 or by holding the hose 26 adjacent the opposite wall and spaced from the lever 36 so that the latching loop 39 passes freely and no accidental working of the switch will occur.

While I have shown a preferred embodiment of the invention it will be understood that the invention is capable of variation and modification from the form shown so that its scope should be limited only by the scope of the claims appended hereto.

I claim:

1. In a vacuum cleaning system, a source of vacuum, a vacuum outlet, means including a conduit leading from said outlet to said source, a vacuum hose telescopically mounted within said conduit for withdrawal movement outwardly of said conduit through said outlet to extended position and being releasably holdable in said extended position and for movement inwardly of said conduit through said outlet to stored position within said conduit, sealing means on and movable with said hose in sealing engagement with said conduit and providing a pressure area which when subjected to the vacuum pressure of said source is effective upon releasing of said hose for moving said hose into stored position within said conduit, hose operated means for actuating said source of vacuum in response to pulling of said hose substantially completely outwardly of said conduit to said extended position, and other hose operated means for disabling said source of vacuum in response to movement of said hose substantially completely inwardly of said conduit to said stored position within said conduit, 2. A vacuum cleaning system according to claim 1 including a latch device comprising a part on said hose and means adjacent said outlet for releasably holding said hose in its extended position.

3. A vacuum cleaning system according to claim 1 in which said source of vacuum comprises a vacuum pump and an electrical motor drivingly connected to said pump, and in which said hose operated means comprise electrical switch means in circuit with said motor.

4. In a vacuum cleaning system, a source of vacuum, including a motor, a vacuum outlet, means including a conduit leading from said outlet to said source, a vacuum hose telescopically mounted within said conduit for withdrawal movement outwardly of said conduit through said outlet to extended position while communicating with said source via said conduit and being releasably holdable in said extended position, and for movement inwardly of said conduit through said outlet to stored position within said conduit, said hose being responsive to the release of the hose and to the presence of vacuum pressure in said conduit for being moved into said conduit for storage, said conduit including a bend through which said hose extends when stored, sealing means of a flexible character on said hose for passing around said bend, said hose including end portions of enlarged character, one of said end portions comprising said sealing means and being closer to the inner end of said hose than the other of said end portions, control means for said source of vacuum including a switch electrically connected to said motor and adapted to be disposed in both "on" and "off" positions, said one of said hose end portions being adapted to operate said switch to place it in "on" condition when said hose is extended and said other of said hose end portions being adapted to operate said switch to place it in "off" condition when said hose is substantially fully retracted, and latch means including a part on said hose and means adjacent said outlet for holding said hose in extended position.

References Cited in the file of this patent
UNITED STATES PATENTS

| | | |
|---|---|---|
| 1,217,817 | Peters | Feb. 27, 1917 |
| 1,255,175 | Kellogg | Feb. 5, 1918 |
| 1,445,930 | Barringer | Feb. 20, 1923 |
| 1,810,607 | Irons | June 16, 1931 |
| 1,864,182 | Boyer | June 21, 1932 |
| 2,332,940 | Senke | Oct. 26, 1943 |
| 2,641,790 | Coult | June 16, 1953 |
| 2,803,847 | Hobbs | Aug. 27, 1957 |